United States Patent
Kim et al.

(10) Patent No.: US 8,369,300 B2
(45) Date of Patent: Feb. 5, 2013

(54) METHOD AND APPARATUS FOR TRANSMITTING BY USING TRANSMIT DIVERSITY AT DFT SPREAD OFDMA

(75) Inventors: Il-Gyu Kim, Seoul (KR); Hyeong-Geun Park, Daejeon (KR); Kap-Seok Chang, Daejeon (KR); Young-Hoon Kim, Daejeon (KR); Seung-Chan Bang, Daejeon (KR); Eun-Jeong Shin, Daejeon (KR); Hye-Kyung Jwa, Daejeon (KR); Moon-sik Lee, Daejeon (KR)

(73) Assignees: Electronics and Telecommunications Research Institute, Daejeon (KR); SK Telecom., Co., Ltd, Seoul (KR); KT Corporation, Seongnam (KR)

( * ) Notice: Subject to any disclaimer, the term of this patent is extended or adjusted under 35 U.S.C. 154(b) by 270 days.

(21) Appl. No.: 12/094,238

(22) PCT Filed: Nov. 17, 2006

(86) PCT No.: PCT/KR2006/004844
§ 371 (c)(1),
(2), (4) Date: May 19, 2008

(87) PCT Pub. No.: WO2007/058494
PCT Pub. Date: May 24, 2007

(65) Prior Publication Data
US 2008/0316913 A1     Dec. 25, 2008

(30) Foreign Application Priority Data

Nov. 17, 2005 (KR) .................. 10-2005-0110047
Sep. 20, 2006 (KR) .................. 10-2006-0091405

(51) Int. Cl.
*H04B 7/208* (2006.01)
(52) U.S. Cl. ........................ 370/344; 370/210
(58) Field of Classification Search ............. 370/210, 370/337, 344
See application file for complete search history.

(56) References Cited

U.S. PATENT DOCUMENTS

| | | | |
|---|---|---|---|
| 6,795,508 | B1 | 9/2004 | Odenwalder et al. |
| 6,961,545 | B2 | 11/2005 | Tehrani et al. |

(Continued)

FOREIGN PATENT DOCUMENTS

| | | |
|---|---|---|
| EP | 1533966 A2 | 5/2005 |
| KR | 1999-0088235 A | 12/1999 |

(Continued)

OTHER PUBLICATIONS

3GPP TSG RAN WG1 # 43, Transmit Antenna Selection Techniques for Uplink E-UTRA, Nov. 7, 2005.

(Continued)

*Primary Examiner* — Phuc Tran
(74) *Attorney, Agent, or Firm* — Kile Park Goekjian Reed & McManus PLLC

(57) ABSTRACT

The present invention relates to a packet data transmission method in an OFDMA system and an apparatus thereof. The present invention provides a user packet data transmission method including generating a RACH burst for channel information estimation, selecting a first antenna among a plurality of antennas, transmitting the RACH burst through the first antenna to a base station, receiving a data transmission acceptance signal from the base station, in response to the RACH burst, transmitting user packet data through the first antenna when receiving a signal indicating that the data transmission is allowed, and selecting a second antenna that is difference from the first antenna and transmitting a RACH burst through the second antenna when receiving a signal indicating that the data transmission is not allowed, and a transmitting apparatus of a mobile station having the plurality of antennas. According to the present invention, the RACH burst and user packet data are transmitted by using a mobile station having a plurality of antennas in an LTE-applied OFDMA system, and therefore data transmission can be performed with a wide bandwidth and high data rate and a deep fading period that may occur during the data transmission can be reduced, thereby preventing call dropping and improving data transmission performance.

19 Claims, 6 Drawing Sheets

U.S. PATENT DOCUMENTS

| | | | |
|---|---|---|---|
| 6,999,728 B2* | 2/2006 | Delaveau et al. | 455/67.16 |
| 7,031,398 B2 | 4/2006 | Odenwalder et al. | |
| 7,039,370 B2* | 5/2006 | Laroia et al. | 455/101 |
| 7,133,421 B1* | 11/2006 | Puhakainen et al. | 370/498 |
| 7,486,931 B2 | 2/2009 | Cho et al. | |
| 7,492,743 B2* | 2/2009 | Uhlik | 370/337 |
| 2001/0046864 A1 | 11/2001 | Bhatoolaul et al. | |
| 2004/0001429 A1 | 1/2004 | Ma et al. | |
| 2004/0062226 A1 | 4/2004 | Uhlik | |
| 2004/0116079 A1* | 6/2004 | Kim et al. | 455/103 |
| 2004/0147289 A1 | 7/2004 | Paljug et al. | |
| 2005/0061005 A1 | 3/2005 | Lepretre et al. | |
| 2005/0286409 A1* | 12/2005 | Yoon et al. | 370/210 |

FOREIGN PATENT DOCUMENTS

| | | |
|---|---|---|
| KR | 1019990086133 | 12/1999 |
| KR | 10-2005-0101111 A | 10/2005 |
| WO | 9959263 | 11/1999 |
| WO | 2005/039233 A1 | 4/2005 |

OTHER PUBLICATIONS

Michel T. Ivrlac, et al., "On Timed-Switched Space-Time Transmit Diversity in MISO Systems", IEEE, 2002, pp. 710-714.

International Search Report PCT/KR2006/004844 Dated Feb. 22, 2007.

Written Opinion PCT/KR2006/004844 Dated Feb. 22, 2007.

* cited by examiner

METHOD AND APPARATUS FOR TRANSMITTING BY USING TRANSMIT DIVERSITY AT DFT SPREAD OFDMA

BACKGROUND OF THE INVENTION (a) Field of the Invention

The present invention relates to a packet data transmission method in orthogonal frequency division multiplex access (OFDMA), and an apparatus thereof. More particularly, it relates to a packet data transmission method using transmit diversity in an uplink of a cellular system using a discrete Fourier transform spread orthogonal frequency division multiplex access (DFT-S-OFDMA) method, and a transmitting apparatus thereof.

(b) Description of the Related Art

Including a wireless local area network (WLAN), wireless broadcasting, or digital multimedia broadcasting (DMB), a fourth generation mobile communication system uses an orthogonal frequency division multiplex access (OFDMA) method for wideband high-speed data transmission.

The OFDMA method divides a frequency bandwidth of a channel into a plurality of frequency bandwidths and allocates a proper number of data bits to each bandwidth for transmission. Herein, each frequency bandwidth has a different gain and noise effect. The OFDMA method serially inputs a data stream into N parallel data rows and transmits the N parallel data rows respectively through separate subcarriers so as to increase the data rate. In this case, a discrete Fourier transform spread orthogonal frequency division multiplex access (DFT-S-OFDMA) method is used to discretely separate an OFDMA signal into a time axis and a frequency axis so as to analyze a complex signal.

A high data rate in a transmitting station and a receiving station of the OFDMA system can be realized by improving link throughputs and network capacity. In this case, the throughput can be significantly improved when the transmitting station and the receiving station respectively have multiple antennas, and thus each station transmits and receives data by using the multiple antennas. As described, a method for the transmitting station and the receiving station to transmit/receive data by using the multiple antennas is called multiple-input multiple-output (MIMO).

In an MIMO-applied OFDMA system, a transmitting station must distinguish a receiving station from other receiving stations when the corresponding receiving station attempts random access. Accordingly, a random access channel burst (RACH burst) is used to check channel estimation information including a frequency domain signature sequence or a time domain signature sequence, an identifier (ID) of a receiving station, and a resource request for call setting.

Recently, a transmitter of the OFDM system has included a transmit vector decision module and a transmit antenna decision module in order to select a specific antenna through which a RACH burst or a user packet data is transmitted among multiple antennas.

In addition, the transmit vector decision module calculates a transmit weight to be set for each antenna by using channel information calculated from a signal to noise ratio (SNR) or a code book, and the transmit antenna decision module selects an antenna unit through which the RACH burst or the user packet data is transmitting by using the transmit weight. Herein, the antenna unit includes an inverse fast Fourier transform (IFFT) unit, a cyclic prefix (CP) adder, a parallel-to-serial (P/S) converter, an intermediate frequency/radio frequency (IF/RF) converter, and an antenna.

That is, the transmitter of the OFDM system includes a multiplexer, a transmit vector decision module, a transmit antenna decision module, a plurality of IFFTs, a CP adder, a P/S converter, an IF/RF converter, and an antenna. As described, the transmitter has drawbacks including having many constituent elements, a complicated composition, an increased size of a mobile station, and an increased manufacturing cost.

In addition, although the MIMO is applied to the mobile station, the RACH burst and the user packet data are transmitted only by an antenna selected by the transmit vector decision module and the transmit antenna decision module, and therefore frequency and phase may vary at random, causing a fading effect. Accordingly, the size of a transmit signal may become greater than or smaller than an average size.

A variation speed of the fading effect may vary depending on a moving speed of the mobile station. That is, the variation speed of the fading effect is increased as the moving speed of the mobile station is increased, and the variation speed of the fading effect is decreased as the moving speed of the mobile station is decreased.

Since the variation speed of the fading effect is slow when the moving speed of the mobile station is slow, a deep fading period where the size of a signal is less than an average size is increased. During the deep fading period, a transmitted RACH signal cannot be demodulated so system performance is deteriorated.

Therefore, the transmitting station and the receiving station use all antennas when transmitting/receiving a RACH burst or user packet data to thereby use another antenna for data transmission when the deep fading effect occurs, and hence, a transmission method is required to reduce the deep fading period, and improve system performance.

While using an OFDM method, a MIMO method, and a smart antenna method, a long term evolution (LTE) method has been disclosed to increase a bandwidth that has been limited to 5 Mhz to from this value to 1.25 Mhz to 20 Mhz. With the increase of the bandwidth, the LTE method can support a data rate of 100 Mbps in a moving state and a data rate of 1 Gbps in a stopped state, and the data upload speed becomes 60 Mbps. In addition, the LTE method has a characteristic of grouping an Internet protocol (IP) network and a data network into one group, and therefore a mobile station can be simplified in an OFDM-based wireless access network.

Such an LTE method uses an OFDMA method in a downlink, and uses a DFT-S-OFDMA method in an uplink. However, the RACH burst and the user packet data are transmitted by using one antenna since a method for transmitting DFT-S-OFMDA-based uplink data by using a plurality of antennas has not been realized in the LTE method, and accordingly the deep fading may occur.

SUMMARY OF THE INVENTION

The present invention has been made in an effort to provide a data transmission method using transmit diversity in a DFT-S-OFDMA system transmitting a RACH burst and user packet data using all of a plurality of antennas for realization of an LTE technology using a plurality of antennas, and a transmitting apparatus of a mobile station for the transmission method.

An exemplary packet data transmission method according to one embodiment of the present invention is provided to a mobile station having a plurality of antennas in an orthogonal frequency division multiplex access (OFDMA) system. The packet data transmission method includes (a) generating a random access channel (RACH) burst for channel information estimation, (b) selecting a first antenna among the plurality of antennas and transmitting the RACH burst to a base station through the first antenna, (c) receiving a signal including information on whether the base station allows data transmission, in response to the RACH burst, and (d) when receiving a signal indicating that the data transmission is allowed, transmitting user packet data through the antenna. When receiving a signal indicating that the data transmission is not allowed, a second antenna that is difference from the first antenna is selected, and the RACH burst is transmitted through the second antenna.

An exemplary packet data transmission method according to another embodiment of the present invention is provided to a mobile station having a plurality of antennas in an OFDMA system. The packet data transmission method includes (a) generating a random access channel (RACH) burst to be transmitted to a base station for channel information estimation, (b) transmitting the RACH burst to the base station by sequentially using the plurality of antennas, (c) receiving a signal transmitted from the base station, the signal indicating whether that transmission is allowed, in response to the RACH burst, and (d), when receiving a signal indicating that the data transmission is allowed, transmitting user packet data through an antenna that has been used for transmitting the RACH burst.

An exemplary transmitting apparatus according to another embodiment of the present invention is provided to a mobile station having a plurality of antennas in an OFDMA system. The transmitting apparatus includes a symbol-subcarrier mapper, an inverse fast Fourier transform (IFFT) unit, and a switching block. The symbol-subcarrier mapper maps a random access channel (RACH) burst to a subcarrier. The IFFT unit converts the RACH burst mapped to the subcarrier to time domain data. The switching block selects an antenna for transmitting the RACH burst output from the IFFT unit from the plurality of antennas.

An exemplary recording medium according to another embodiment of the present invention is installed on a mobile station having a plurality of antennas in an OFDMA system for user packet transmission. The recording medium stores a program that executes functions, including generating a random access channel burst (RACH) for channel information estimation, selecting a first antenna among the plurality of antennas and transmitting the RACH burst through the first antenna to a base station; receiving a signal indicating whether the base station allows data transmission of the base station, in response to the RACH burst; and transmitting the user packet data through the first antenna when a signal indicating that the data transmission is allowed is received and selecting a second antenna that is different from the first antenna and transmitting the RACH burst through the second antenna when a signal indicating that the data transmission is not allowed is received.

DETAILED DESCRIPTION OF THE EMBODIMENTS

Figure 1:
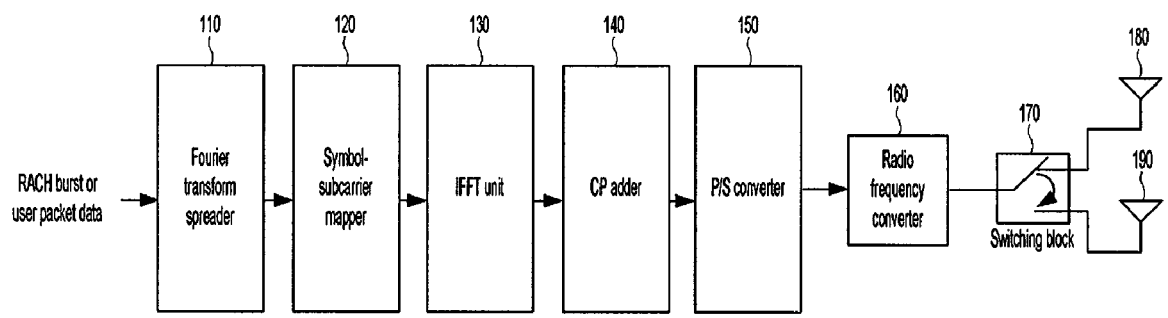
FIG. 1 is a schematic block diagram of a transmitter of a mobile station in a DFT-S-OFDMA system, transmitting a RACH burst or user packet data according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

Further, throughout this specification and the claims which follow, each block is a unit that performs a specific function or operation, and can be realized by hardware or software, or a combination of both.

FIG. 1 a schematic block diagram of a transmitter of a mobile station of a DFT-S-OFDMA system that transmits a RACH burst or user packet data by using transmit diversity according to an exemplary embodiment of the present invention.

The transmitter of the mobile station according to the exemplary embodiment of the present invention includes a Fourier transform spreader 110, a symbol-subcarrier mapper 120, an inverse Fourier transform unit 130, a cyclic prefix adder (hereinafter referred to as a "CP adder") 140, a parallel to serial converter (hereinafter referred to as a "P/S converter") 150, a radio frequency converter 160, a switching block 170, and a plurality of antennas. It is illustrated in FIG. 1 that a transmitter of a mobile station has two antennas, for convenience of description.

The Fourier transform spreader 110 performs a spreading operation by performing a fast Fourier transform operation or a discrete Fourier transform operation on a RACH burst or user packet data input when the mobile station attempts random access.

When M data symbols are input to the Fourier transform spreader 110, the Fourier transform spreader 110 performs the fast Fourier transform (FFT) operation when M is $2^n$ and performs the discrete Fourier transform operation when M is not $2^n$. As described, the Fourier transform spreader 110 that processes M input data symbols is commonly called an M-point Fourier transform spreader.

The symbol-subcarrier mapper 120 maps a spread RACH burst or spread user packet data output from the Fourier transform spreader 110 to an OFDMA subcarrier.

In this case, the Fourier transform spreader 110 and the symbol-subcarrier mapper 120 are used to prevent an occurrence of a high peak to average power ratio (PAPR) in a conventional OFDMA method.

Figure 2:
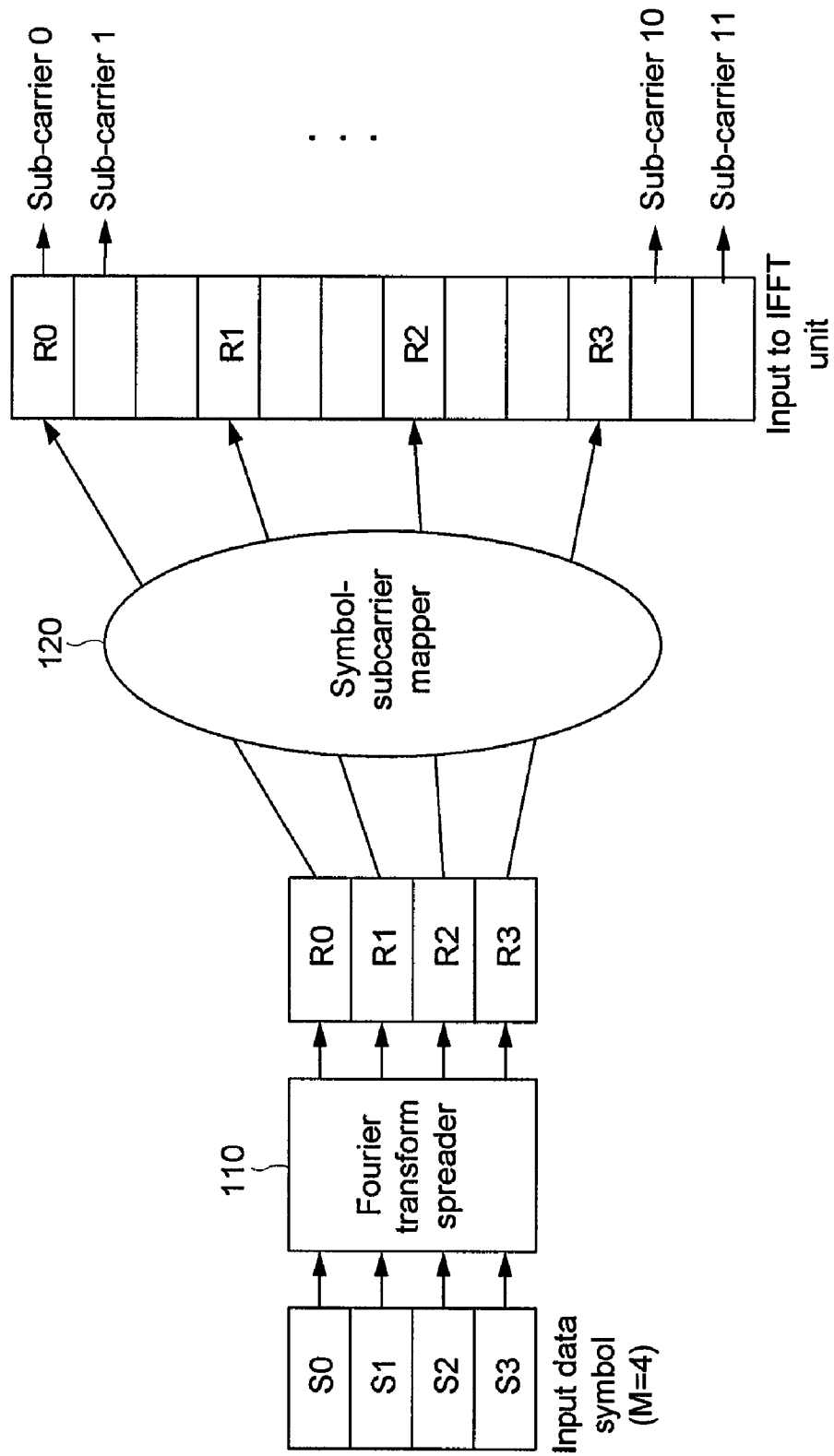
FIG. 2 shows a process for mapping data symbols by using a Fourier transform spreader and a symbol-subcarrier mapper.

FIG. 2 shows a data symbol mapping process of the Fourier transform spreader and the symbol-subcarrier mapper. It is assumed in FIG. 2 that the number of input data symbols is 4 and that the input data symbol is a RACH burst symbol or a user data symbol, for convenience of description.

The Fourier transform spreader 110 performs an FFT spreading process on the four input symbols S0, S1, S2, and S3. In addition, the symbol-subcarrier mapper 120 maps the FFT spreading processed-symbols R0, R1, R2, and R3 to a subcarrier of the inverse Fourier transform unit 130. It is illustrated in FIG. 2 that the inverse Fourier transform unit 130 has 12 subcarriers, and that the four FFT-spread symbols R0, R1, R2, and R3 are respectively mapped to a subcarrier 0, a subcarrier 3, a subcarrier 6, and a subcarrier 9 by the symbol-subcarrier mapper 120.

As described, a PAPR can be reduced by mapping the RACH burst or the user packet data to a subcarrier by using the Fourier transform spreader 110 and the symbol-subcarrier mapper 120, and accordingly, uplink cell coverage can be increased when using a power amplifier that is the same as in the conventional OFDMA method.

The inverse Fourier transform unit 130 inverse-Fourier transforms the RACH burst of the user packet data mapped to the subcarrier to time domain data.

The CP adder 140 adds a cyclic prefix (CP) to a front end of the time domain data, and the P/S converter 150 converts the CP-added RACH burst or user packet data in a parallel signal form into a serial signal.

The digital-type RACH burst or user packet data serially converted by the P/S converter 150 is converted into a radio frequency (RF) signal and filtered through the radio frequency converter 160. For this purpose, the radio frequency converter 160 includes an up-converter, an amplifier, and a filter.

The switching block 170 selects an antenna through which a RACH burst is transmitted so as to alternately transmit the RACH burst delivered from the radio frequency converter 160 through a different antenna. That is, as shown in FIG. 1, in the transmitter of the DFT-S-OFDMA system including two antennas 180 and 182, when more than two RACH bursts are transmitted to the switching block 170, the switching block 170 alternately transmits the RACH bursts through the first antenna 180 and the second antenna 182. Accordingly, the first antenna 180 and the second antenna 182 alternately transmit the RACH bursts. In this case, the RACH burst transmitted from the transmitter of the mobile station is transmitted to the base station.

As described, the mobile station transmits the RACH burst to the base station through an antenna selected by the switching block 170, and transmits user packet data through one antenna among a plurality of antennas when receiving a response to the transmitted RACH burst from the base station.

The mobile station of FIG. 1 is formed of one radio frequency converter 160 and one switching block 170, and the mobile station may be formed of one switching block 170 and a plurality of radio frequency converters 160.

Figure 3:
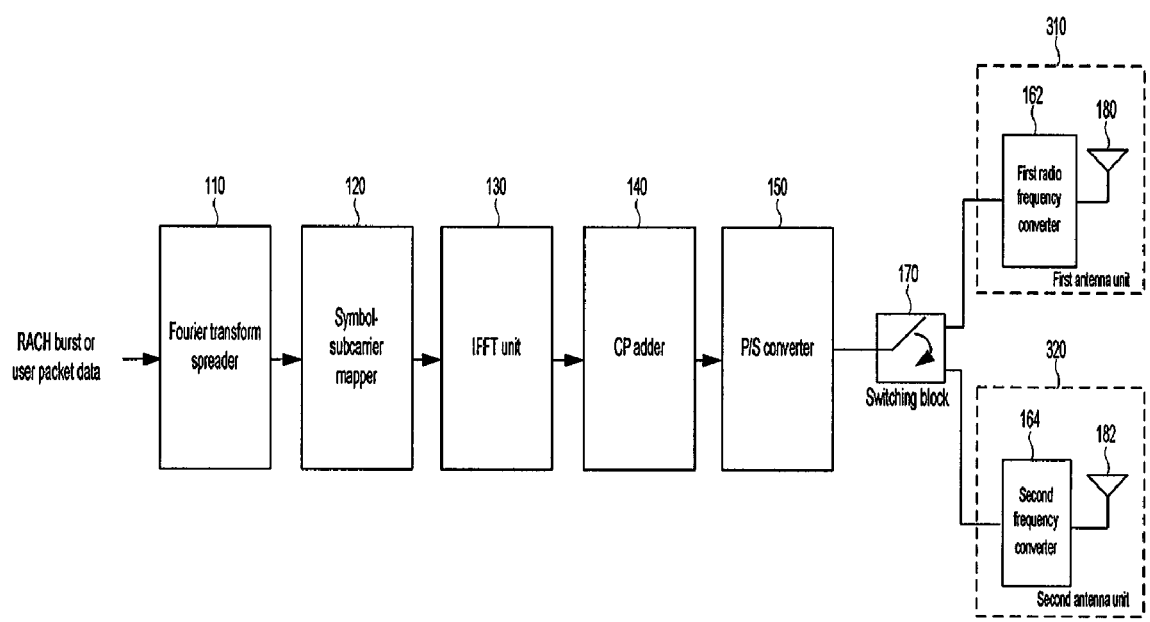
FIG. 3 is a schematic block diagram of a transmitter of a DFT-S-OFDMA system according to another embodiment of the present invention.

FIG. 3 is a schematic block diagram of the transmitter of the DFT-S-OFDMA system according to another exemplary embodiment of the present invention.

A transmitter of a mobile station according to this exemplary embodiment of the present invention includes a Fourier transform spreader 110, a symbol-subcarrier mapper 120, an inverse Fourier transform unit 130, a CP adder 140, and a P/S converter 150 that are the same constituent elements of the transmitter of FIG. 2.

The switching block 170 that receives an digital-type RACH burst that has been converted into a serial signal from the P/S converter 150 alternately selects the RACH burst through a first antenna unit 310 and a second antenna unit 320.

When the RACH burst is transmitted through the first antenna unit 310 by the switching block 170, a first radio frequency converter 162 converts the RACH burst into an RF signal and filters the radio frequency signal by using an up-converter, an amplifier, and a filter, and transmits the filtered RF signal to a first antenna 180. The first antenna 180 transmits the received RACH burst to the base station.

When the switching block 170 selects the second antenna unit 320 and thus the RACH burst is transmitted to the second antenna unit 320, the second radio frequency converter 164 of the second antenna unit 320 converts and filters the transmitted RACH burst into a radio frequency signal by using an up-converter, an amplifier, and a filter, and delivers the filtered signal to a second antenna unit 182. The second antenna 182 transmits the received RACH burst to the base station.

The transmitter of the DFT-S-OFDMA system, formed as shown in FIG. 3, further includes one radio frequency converter as opposed to the transmitter of FIG. 1. In this case, a switching operation of the switching block 170 is performed in a baseband, and therefore the RACH burst can be transmitted by using frequency and spectrum of the original RACH burst.

The transmitter of the DFT-S-OFDMA system of FIG. 1 and FIG. 3 transmits a RACH burst and user packet data to the base station through an LTE uplink frame.

Figure 4:
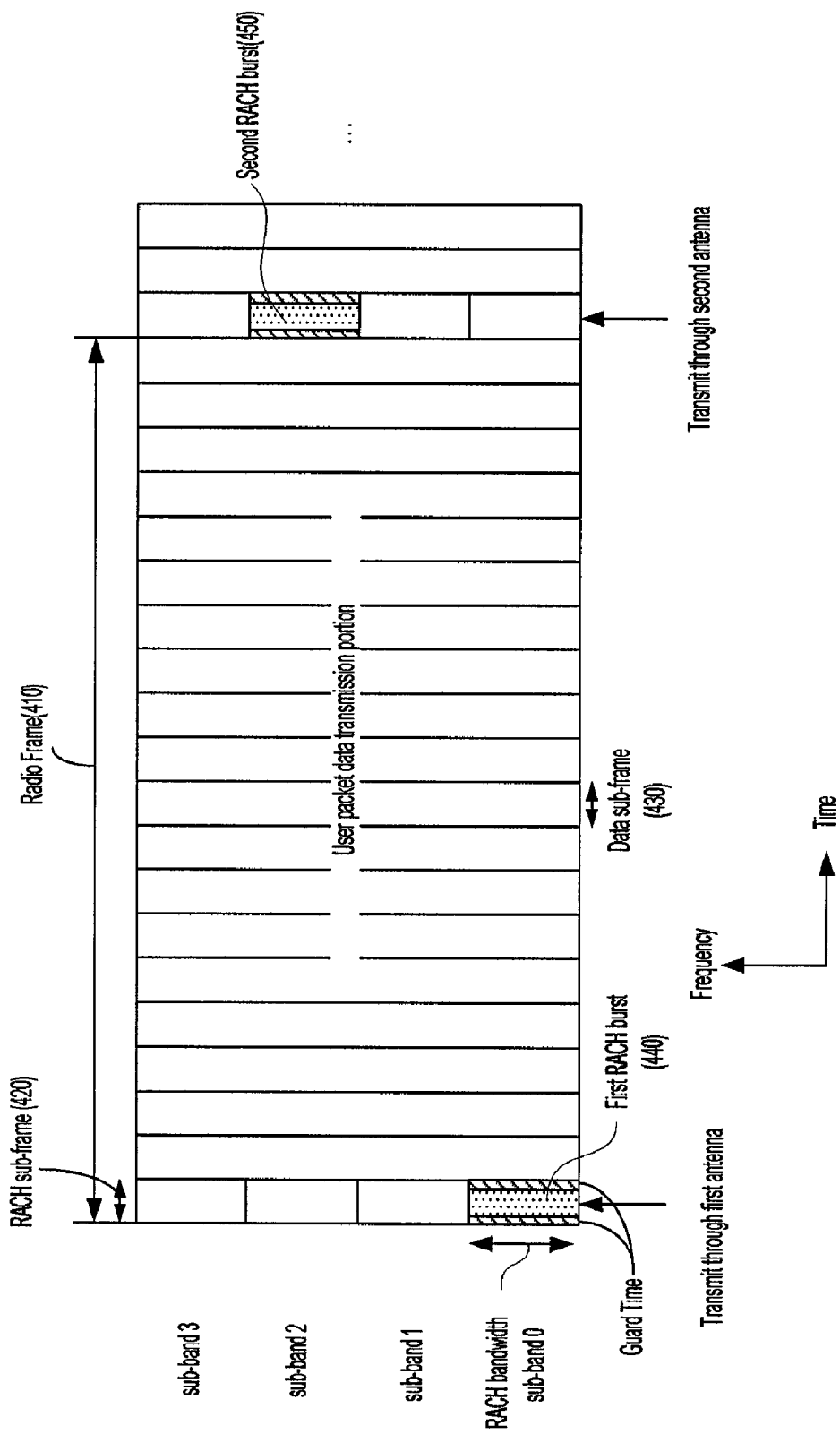
FIG. 4 shows a structure of an LTE uplink frame using a DFT-S-OFDMA method.

FIG. 4 shows a configuration diagram of an LTE uplink frame that uses the DFT-S-OFDMA method according to the exemplary embodiment of the present invention.

An uplink frame used in the exemplary embodiment of the present invention is formed of a plurality of radio frames 410, and each radio frame 410 includes one RACH sub-frame 420 and a plurality of data sub-frames 430.

The RACH sub-frame 420 includes a RACH burst to be transmitted to the base station from the mobile station, and a guard time is provided in a front end of the RACH burst.

In addition, the RACH sub-frame 420 transmits the RACH burst by using one sub-band among a plurality of sub-bands as a bandwidth according to frequency. FIG. 4 shows an LTE uplink frame including four sub-bands: sub-band 0, sub-band 1, sub-band 2, and sub-band 3, and a first RACH burst 440 transmitted through a first antenna in the first RACH sub-frame 420 is transmitted to a bandwidth of the sub-band 0.

In addition, the RACH burst transmitted through the RACH sub-frame 420 is transmitted through different antennas at regular intervals (i.e., radio frame intervals).

That is, the first RACH burst 440 is transmitted through the first antenna to a bandwidth of a specific sub-band (sub-band 0 in FIG. 4), and a second RACH burst 450 is transmitted through a second antenna to a bandwidth of another sub-band (sub-band 2 in FIG. 4) after user packet data is transmitted through the plurality of data frames during one radio frame.

When receiving the RACH burst, the base station transmits a response to the received RACH burst to the mobile station. When the base station allows packet data transmission of the mobile station, the base station transmits an ACK signal, and when the base station does not allow the packet data transmission of the mobile station, the base station transmits a NACK signal.

The base station transmits a transmission timing control bit to a downlink after demodulating the RACH burst so as to control a signal transmitted from each mobile station to the base station to be included within a CP.

Figure 5:
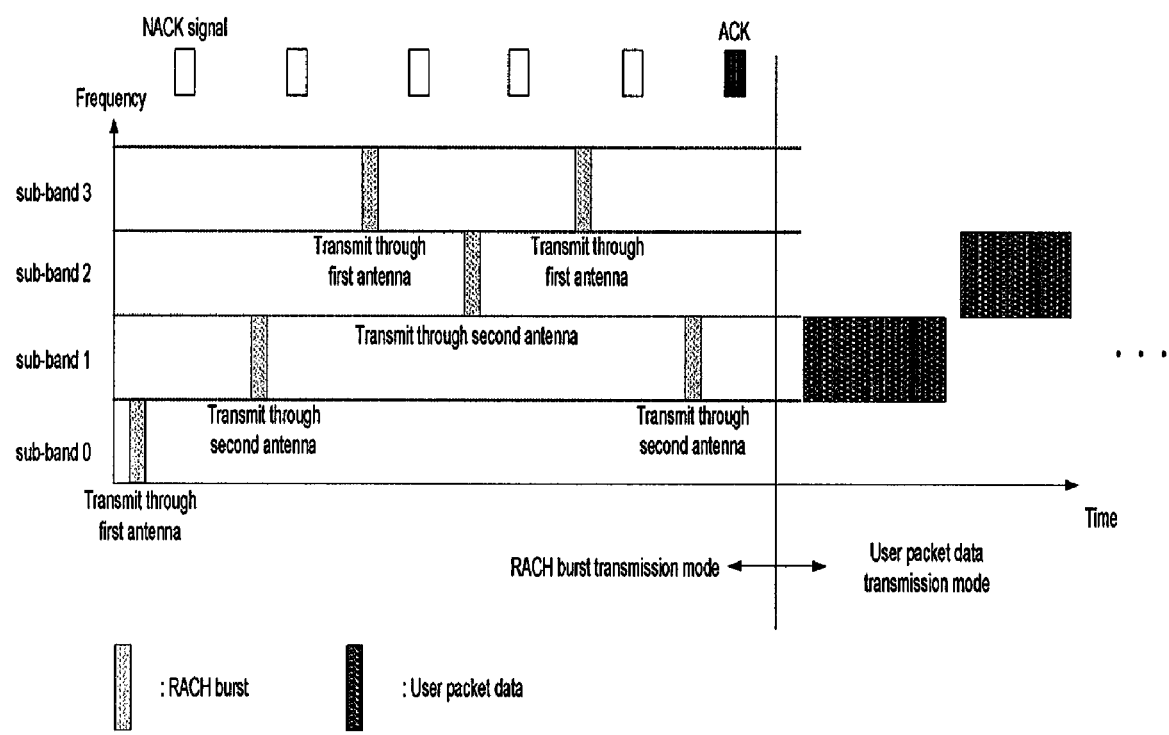
FIG. 5 exemplarily shows a process for transmitting a RACH burst or user packet data by simultaneously applying antenna switching diversity and frequency hopping to a RACH channel.

FIG. 5 exemplarily shows a process for transmitting a RACH burst or user packet data by simultaneously applying switching diversity and frequency hopping to a RACH channel.

The mobile station generates a RACH burst with a constant interval, and transmits the generated RACH burst through an antenna selected by the switching block 170. Herein, the mobile station includes a transmitter that includes a first antenna 180 and a second antenna 182, and transmits a RACH burst as shown in FIG. 1 and FIG. 3.

The mobile station transmits a first RACH burst through the first antenna. In this case, the mobile station is set to a RACH burst transmission mode, and the first RACH burst transmitted from the mobile station has a bandwidth of the sub-band 0.

When receiving the first RACH burst transmitted through the bandwidth of the sub-band 0 from the mobile station, the base station demodulates the received first RACH burst and transmits an ACK or NACK to the mobile station as a response. When receiving the NACK response from the base station, the mobile station transmits a second RACH burst after a constant time (i.e. data sub-frame transmission time) passed. In this case, the switching block 170 of the mobile station selects the second antenna and transmits the second RACH burst through the second antenna. In addition, the second RACH burst is transmitted through another sub-band that is different from that of the first RACH burst. In FIG. 5, the second RACH burst is transmitted through a bandwidth of the sub-band 1.

When receiving the second RACH burst from the mobile station, the base station demodulates the second RACH burst and transmits an ACK response or a NACK response. When the base station transmits the NACK response to the mobile station, the mobile station transmits a third RACH burst through a bandwidth of a sub-band 3 by using the first antenna, and receives an ACK response or a NACK response for the third RACH burst from the base station.

When the mobile receives an ACK response from the base station while repeating the above-state process, the mobile station changes its mode from the RACH burst transmission mode to a user packet data transmission mode, transmits user packet data through a bandwidth of a sub-band (i.e., sub-band 1 of FIG. 5) through which a RACH burst is transmitted before receiving the ACK response from the base station by using an antenna (i.e., the second antenna of FIG. 5) through which a RACH burst (i.e., the sixth RACH burst of FIG. 5) is transmitted before receiving the ACR response from the base station.

Figure 6:
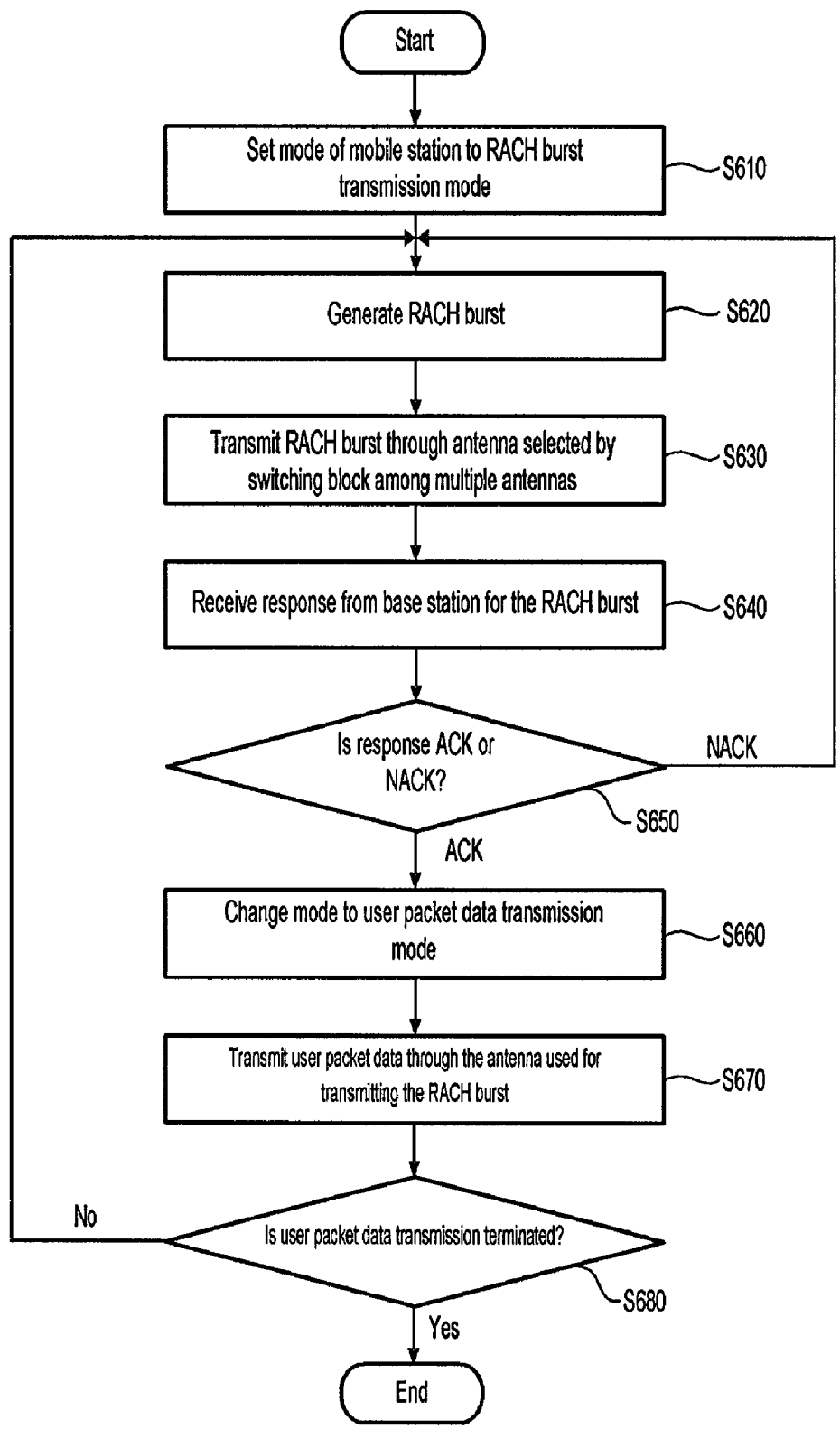
FIG. 6 is a flowchart of a random access channel transmission process using transmit diversity according to an exemplary embodiment of the present invention.

FIG. 6 is a flowchart of a random access channel transmission process using transmit diversity according to the exemplary embodiment of the present invention.

When a mobile station having a plurality of antennas of the DFT-S-OFDMA system transmits user packet data by using an uplink, the mobile station must check a frequency domain signature sequence, a time domain signature sequence, a base station identifier (ID), and resource request information for call setting for the user packet data transmission, and therefore the mobile station needs to transmits a RACH burst to the base station. Accordingly, the mobile station sets a RACH burst transmission mode for generation and transmission of the RACH burst, in step S610.

The mobile station sets its mode to the RACH burst transmission mode and generates a RACH burst in step S620. Then, the mobile station delivers the generated RACH burst to the switching block 170 through the Fourier transform spreader 110, the symbol-subcarrier mapper 120, the inverse Fourier transform unit 130, the CP adder 140, and the P/S converter 150. In this case, the RACH burst may be delivered to the switching block 170 after being converted into a radio frequency signal and filtered through the radio frequency converter 160.

The switching block 170 selects one antenna among the plurality of antennas of the mobile station, and transmits the RACH burst through the selected antenna. In this case, the switching block 170 randomly selects an antenna. In addition, the RACH burst is transmitted through a RACH sub-frame of the LTE uplink frame, and a bandwidth of the RACH sub-frame uses a specific sub-band among frequencies of the LTE uplink frame, in step S630.

When receiving the RACH burst transmitted from the mobile station, the base station transmits an ACK signal or a NACK signal to the mobile station in response to the RACH burst. The mobile station checks transmission of the RACH burst through the response transmitted from the base station, in step S640.

When receiving the NACK signal from the base station, the mobile station generates a RACH burst, transmits the RACH burst by using an antenna selected by the switching block 170, and repeats the above-stated processes from step S620 after checking a response from the base station. In this case, the switching block 170 may select an antenna that is different from the antenna through which the previous RACH burst was transmitted.

However, when receiving the ACK signal from the base station in step S650, the mobile station changes its mode to the user packet data transmission mode in step S660, and transmits user packet data by using the antenna through which the RACH burst has been transmitted. In this case, the same bandwidth of the specific sub-band through which the RACH burst has been transmitted may be used, in step S670.

The mobile station checks whether the user packet data transmission is completed, and terminates uplink transmission of the mobile station when the user packet data transmission is completed. When the user packet data transmission is not completed, the mobile station repeats the above-stated processes from step S620, in step S680. That is, the mobile station generates a RACH burst and transmits the RACH burst to the base station, and when the base station transmits an ACK response for the transmitted RACH burst, the mobile station transmits user packet data by using the corresponding antenna.

Through the above-stated processes, the mobile station having more than two transmit antennas transmits a RACH burst by using transmit diversity over the uplink of the DFT-S-OFDMA system.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiments of the present invention, a RACH burst and user packet data are transmitted by using a mobile station including multiple antennas in an LTE-applied OFDMA system, and therefore data transmission can be performed with a wide bandwidth and a high data rate, and the deep fading period that may occur during the data transmission can be reduced, thereby preventing call dropping and improving transmission performance.

What is claimed is:

1. A packet data transmission method of a mobile station including a plurality of antennas, in an orthogonal frequency division multiplex access (OFDMA) system, the packet data transmission method comprising:
   (a) generating a first random access channel (RACH) burst for channel information estimation;
   (b) selecting a first antenna among the plurality of antennas and transmitting the first RACH burst to a base station through the first antenna;
   (c) receiving a signal including information on whether the base station allows or does not allow data transmission, in response to the first RACH burst; and
   (d) when the received signal includes information indicating the base station allows data transmission, transmitting user packet data through the first antenna used for transmitting the first RACH burst,
   wherein when the received signal includes information indicating the base station does not allow data transmission, selecting in the mobile station a second antenna that is different from the first antenna and transmitting a second RACH burst through the second antenna,
   wherein in (d), when the signal including information indicating the base station allows data transmission is received, transmitting the user packet data by using the sub-band which was used for transmitting the last RACH burst.

2. The packet data transmission method of claim 1, wherein, before (b), the packet transmission method further comprises setting a mode of the mobile station to a RACH burst transmission mode for transmitting the first RACH burst.

3. The packet data transmission method of claim 2, wherein, when the signal including information indicating the base station allows data transmission is received, the RACH burst transmission mode is changed to a user packet data transmission mode.

4. A packet data transmission method of a mobile station including a plurality of antennas, in an orthogonal frequency division multiplex access (OFDMA) system, the packet data transmission method comprising:
   (a) generating a first random access channel (RACH) burst for channel information estimation;
   (b) selecting a first antenna among the plurality of antennas and transmitting the first RACH burst to a base station through the first antenna;
   (c) receiving a signal including information on whether the base station allows or does not allow data transmission, in response to the first RACH burst; and
   (d) when the received signal includes information indicating the base station allows data transmission, transmitting user packet data through the first antenna used for transmitting the first RACH burst,
   wherein when the received signal includes information indicating the base station does not allow data transmission, selecting in the mobile station a second antenna that is different from the first antenna and transmitting a second RACH burst through the second antenna,
   wherein the transmission of the second RACH burst through the second antenna further comprises:
      receiving a second signal indicating whether the base station allows or does not allow the data transmission, in response to the second RACH burst transmitted through the second antenna; and
      when the received second signal indicates that the base station allows the data transmission, transmitting the user packet data through the second antenna, and
      when the received second signal indicates that the base station does not allow the data transmission, selecting a third antenna or the first antenna and transmitting through the selected antenna, the selected antenna being different from the second antenna.

5. A packet data transmission method of a mobile station including a plurality of antennas, in an orthogonal frequency division multiplex access (OFDMA) system, the packet data transmission method comprising:
   (a) generating a first random access channel (RACH) burst for channel information estimation;
   (b) selecting a first antenna among the plurality of antennas and transmitting the first RACH burst to a base station through the first antenna;
   (c) receiving a signal including information on whether the base station allows or does not allow data transmission, in response to the first RACH burst; and
   (d) when the received signal includes information indicating the base station allows data transmission, transmitting user packet data through the first antenna used for transmitting the first RACH burst,
   wherein when the received signal includes information indicating the base station does not allow data transmission, selecting in the mobile station a second antenna that is different from the first antenna and transmitting a second RACH burst through the second antenna,
   wherein the second antenna transmits the second RACH burst by using a sub-band that is different from the sub-band used for transmitting the first RACH burst by the first antenna.

6. The packet data transmission method of claim 5, wherein in (d), when the signal including information indicating the base station allows data transmission is received, transmitting the user packet data by using the sub-band which was used for transmitting the last RACH burst.

7. A packet data transmission method of a mobile station having a plurality of antennas in an orthogonal frequency division multiplex access (OFDMA) system, the packet data transmission method comprising:
   (a) generating a first random access channel (RACH) burst to be transmitted to a base station for channel information estimation;
   (b) transmitting the first RACH burst to the base station by sequentially using different antennas of the plurality of antennas;
   (c) receiving a signal transmitted from the base station, the signal indicating whether the base station allows or does not allow data transmission, in response to the first RACH burst; and
   (d) when the received signal indicates that the base station allows data transmission, transmitting user packet data through the antenna used for transmitting the first RACH burst,
   wherein when receiving a signal indicating that the data transmission is not allowed, selecting a second antenna that is different from the antenna and transmitting a second RACH burst through the second antenna,
   wherein in (d), when the received signal indicates that the base station allows data transmission, transmitting the user packet data by using the sub-band which was used for transmitting the last RACH burst.

8. The packet data transmission method of claim 7, wherein, in (d), the above-stated processes are repeated from step (b) when the received signal indicating that the base station allows data transmission is not received.

9. A transmitting apparatus of a mobile station having a plurality of antennas in an orthogonal frequency division multiple access (OFDMA) system, the transmitting apparatus comprising:
- a plurality of antennas for transmitting signals to a base station and receiving signals from the base station;
- a symbol-subcarrier mapper for mapping a first random access channel (RACH) burst to a subcarrier, the symbol-subcarrier mapper receiving the first RACH burst at an input;
- an inverse fast Fourier transform (IFFT) unit for converting the first RACH burst mapped to the subcarrier to time domain data, the IFFT unit receiving at an input, an output signal of the symbol-subcarrier mapper; and
- a switching block for selecting an antenna of the plurality of antennas and transmitting the first RACH burst output from the IFFT unit to the base station through the selected antenna, the switching block receiving at an input, an output signal of the IFFT unit,
- wherein the switching block selects a second antenna that is different from the antenna used for transmitting the first RACH burst when a signal indicating that the data transmission is not allowed is received from the base station in response to the RACH burst, and transmits a second RACH burst through the second antenna,
- wherein when a signal indicating that the data transmission is allowed is received from the base station in response to the first RACH burst, the transmitting apparatus transmits user packet data by using the sub-band which was used for transmitting the last RACH burst.

10. The transmitting apparatus of claim 9, further comprising a radio frequency converter, connected between the IFFT unit and the switching block, for converting and filtering the first RACH burst output from the IFFT to a radio frequency signal.

11. The transmitting apparatus of claim 9, wherein the switching block sequentially selects the plurality of antennas for each transmission of the first RACH burst.

12. The transmitting apparatus of claim 9, further comprising a fast Fourier transform spreader for performing fast Fourier transform spreading on the first RACH burst and transmitting the spread first RACH burst to the symbol-subcarrier mapper.

13. The transmitting apparatus of claim 9, further comprising:
- a cyclic prefix (CP) adder for adding a CP to the first RACH burst converted to the time domain data through the IFFT unit; and
- a parallel-to-serial (P/S) converter for converting the CP-added first RACH burst in a parallel form to a serial signal.

14. The transmitting apparatus of claim 9, wherein, user packet data is transmitted through an antenna through which the first or second RACH burst is transmitted when the first or second RACH burst is transmitted to the base station and a data transmission acceptance signal for the first or second RACH burst is received from the base station.

15. A transmitting apparatus of a mobile station having a plurality of antennas in an orthogonal frequency division multiple access (OFDMA) system, the transmitting apparatus comprising:
- a plurality of antennas for transmitting signals to a base station and receiving signals from the base station;
- a symbol-subcarrier mapper for mapping a first random access channel (RACH) burst to a subcarrier, the symbol-subcarrier mapper receiving the first RACH burst at an input;
- an inverse fast Fourier transform (IFFT) unit for converting the first RACH burst mapped to the subcarrier to time domain data, the IFFT unit receiving at an input, an output signal of the symbol-subcarrier mapper; and
- a switching block for selecting an antenna of the plurality of antennas and transmitting the first RACH burst output from the IFFT unit to the base station through the selected antenna, the switching block receiving at an input, an output signal of the IFFT unit,
- wherein the switching block selects a second antenna that is different from the antenna used for transmitting the first RACH burst when a signal indicating that the data transmission is not allowed is received from the base station in response to the RACH burst, and transmits a second RACH burst through the second antenna,
- wherein the transmitting apparatus further comprises:
  - a plurality of radio frequency converters for converting and filtering the first RACH burst output from the IFFT unit to a radio frequency signal, and respectively corresponding to the plurality of antennas,
  - wherein each of radio frequency converters is connected between the switching block and the corresponding antenna among the plurality of antennas.

16. A transmitting apparatus of a mobile station having a plurality of antennas in an orthogonal frequency division multiple access (OFDMA) system, the transmitting apparatus comprising:
- a plurality of antennas for transmitting signals to a base station and receiving signals from the base station;
- a symbol-subcarrier mapper for mapping a first random access channel (RACH) burst to a subcarrier, the symbol-subcarrier mapper receiving the first RACH burst at an input;
- an inverse fast Fourier transform (IFFT) unit for converting the first RACH burst mapped to the subcarrier to time domain data, the IFFT unit receiving at an input, an output signal of the symbol-subcarrier mapper; and
- a switching block for selecting an antenna of the plurality of antennas and transmitting the first RACH burst output from the IFFT unit to the base station through the selected antenna, the switching block receiving at an input, an output signal of the IFFT unit,
- wherein the switching block selects a second antenna that is different from the antenna used for transmitting the first RACH burst when a signal indicating that the data transmission is not allowed is received from the base station in response to the RACH burst, and transmits a second RACH burst through the second antenna,
- wherein the transmitting apparatus further comprises:
  - a plurality of radio frequency converters for converting and filtering the first RACH burst output from the IFFT unit to a radio frequency signal, and respectively corresponding to the plurality of antennas,
  - wherein each of radio frequency converters is connected between the switching block and the corresponding antenna among the plurality of antennas,
- wherein the switching block transmits the first RACH burst output from the IFFT unit and user packet data to be transmitted through the transmitting apparatus to a radio frequency converter connected to the selected antenna.

17. A transmitting apparatus of a mobile station having a plurality of antennas in an orthogonal frequency division multiple access (OFDMA) system, the transmitting apparatus comprising:
- a plurality of antennas for transmitting signals to a base station and receiving signals from the base station;

a symbol-subcarrier mapper for mapping a first random access channel (RACH) burst to a subcarrier, the symbol-subcarrier mapper receiving the first RACH burst at an input;

an inverse fast Fourier transform (IFFT) unit for converting the first RACH burst mapped to the subcarrier to time domain data, the IFFT unit receiving at an input, an output signal of the symbol-subcarrier mapper; and a switching block for selecting an antenna of the plurality of antennas and transmitting the first RACH burst output from the IFFT unit to the base station through the selected antenna, the switching block receiving at an input, an output signal of the IFFT unit, wherein the switching block selects a second antenna that is different from the antenna used for transmitting the first RACH burst when a signal indicating that the data transmission is not allowed is received from the base station in response to the RACH burst, and transmits a second RACH burst through the second antenna, wherein the transmitting apparatus further comprises:
a plurality of radio frequency converters for converting and filtering the first RACH burst output from the IFFT unit to a radio frequency signal, and respectively corresponding to the plurality of antennas,
wherein each of radio frequency converters is connected between the switching block and the corresponding antenna among the plurality of antennas,
wherein the switching block transmits the first RACH burst output from the IFFT unit and user packet data to be transmitted through the transmitting apparatus to a radio frequency converter connected to the selected antenna,
wherein the first RACH burst and the user packet data are transmitted through a frequency and spectrum of a baseband.

18. A transmitting apparatus of a mobile station having a plurality of antennas in an orthogonal frequency division multiple access (OFDMA) system, the transmitting apparatus comprising:

a plurality of antennas for transmitting signals to a base station and receiving signals from the base station;

a symbol-subcarrier mapper for mapping a first random access channel (RACH) burst to a subcarrier, the symbol-subcarrier mapper receiving the first RACH burst at an input;

an inverse fast Fourier transform (IFFT) unit for converting the first RACH burst mapped to the subcarrier to time domain data, the IFFT unit receiving at an input, an output signal of the symbol-subcarrier mapper; and a switching block for selecting an antenna of the plurality of antennas and transmitting the first RACH burst output from the IFFT unit to the base station through the selected antenna, the switching block receiving at an input, an output signal of the IFFT unit, wherein the switching block selects a second antenna that is different from the antenna used for transmitting the first RACH burst when a signal indicating that the data transmission is not allowed is received from the base station in response to the RACH burst, and transmits a second RACH burst through the second antenna, wherein the transmitting apparatus further comprises a fast Fourier transform spreader for performing fast Fourier transform spreading on the first RACH burst and transmitting the spread first RACH burst to the symbol-subcarrier mapper, wherein the fast Fourier transform spreader performs a fast Fourier transform operation when the number of symbols of the first RACH burst corresponds to $2^n$, and performs a discrete Fourier transform operation when the number of symbols of the first RACH burst does not correspond to $2^n$.

19. A non-transitory computer-readable recording medium having instructions stored thereon for execution in a mobile station including a plurality of antennas for transmission of user packet data in an orthogonal frequency division multiplex access (OFDMA) system, the recording medium comprising instructions for:

generating in the mobile station a first random access channel burst (RACH) for channel information estimation;

selecting in the mobile station a first antenna among the plurality of antennas and transmitting the first RACH burst through the first antenna from the mobile station to a base station;

receiving at the mobile station a signal indicating whether the base station allows or does not allow data transmission, in response to the first RACH burst; and transmitting from the mobile station the user packet data through the first antenna used for transmitting the first RACH burst when the received signal indicating that the base station allows data transmission is received, and selecting in the mobile station a second antenna that is different from the first antenna used for transmitting the first RACH burst and transmitting from the mobile station a RACH burst through the second antenna when the received signal indicating that the base station does not allow data transmission is received, wherein when the received signal indicating that the base station allows data transmission is received, transmitting the user packet data by using the sub-band which was used for transmitting the last RACH burst.

* * * * *